H. KOPPERS.
PROCESS OF RECOVERING AMMONIUM SULFATE FROM GAS.
APPLICATION FILED JAN. 15, 1908.
953,959.
Patented Apr. 5, 1910.
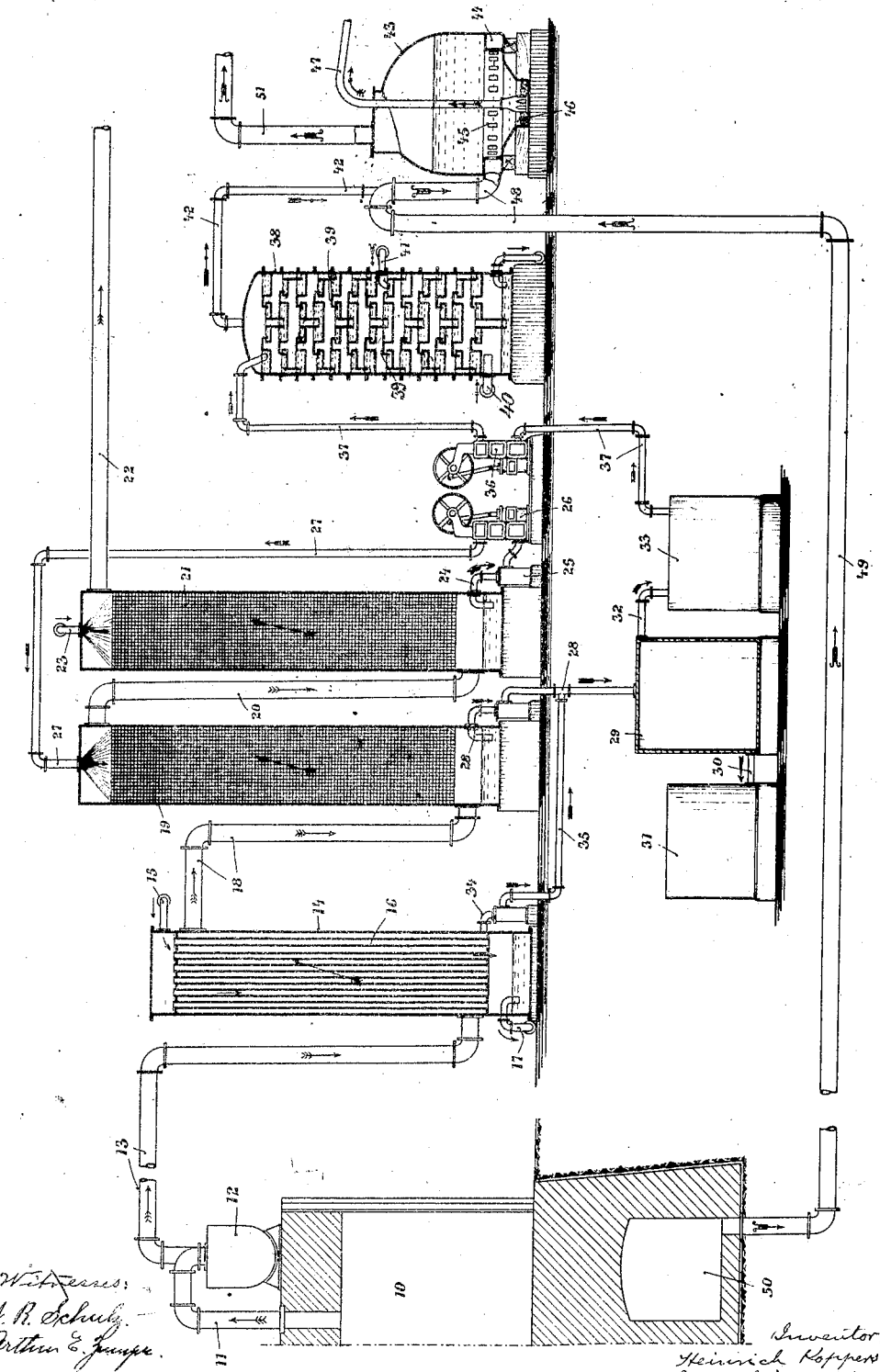

UNITED STATES PATENT OFFICE.

HEINRICH KOPPERS, OF ESSEN-ON-THE-RUHR, GERMANY.

PROCESS OF RECOVERING AMMONIUM SULFATE FROM GAS.

953,959.

Specification of Letters Patent. Patented Apr. 5, 1910.

Application filed January 15, 1908. Serial No. 410,874.

*To all whom it may concern:*

Be it known that I, HEINRICH KOPPERS, a citizen of Germany, residing at Essen-on-the-Ruhr, Germany, have invented new and useful Improvements in Processes of Recovering Ammonium Sulfate from Gas, of which the following is a specification.

From the ammonia water resulting from cooling and washing the gases of the dry distillation or gasification of organic substances, a salt is obtained by driving off the ammonia in a distilling column and treating the resulting vapors with sulfuric acid. As owing to the chemical reaction which thus takes place, the diluting water of the acid is vaporized, and as but the steam carrying the ammonia should be given off to the atmosphere, or, in other words, as the reaction should take place at atmospheric pressure it is necessary to maintain the temperature above the boiling point. This high temperature (in practice at least 150° C.) has the objection that the ammonium sulfate is readily decomposed or disassociated, and that the affinity of the ammonia to the sulfuric acid diminishes with the rising of the temperature. This incurs on the one hand a loss of ammonia, while on the other hand the percentage of free acid in the salt is increased. The present invention relates to a process of obtaining ammonia from gases, which can be carried out at a suitable temperature below the boiling point.

According to my invention the vapors of the distilling column are mixed with a sufficient quantity of a relatively dry gas, so that after the reaction with the acid, not pure steam, but a gas and steam mixture remains. As according to the law of Dalton, the steam in this mixture possesses but a partial pressure, which corresponds to a temperature beneath the boiling point, it is only necessary to maintain this temperature, which may be reduced at pleasure by the addition of the rarefying gases. The addition of these gases corresponds therefore to the carrying out of the process in a more or less complete vacuum, the use of which is coupled with practical difficulties. The nature of the gases is immaterial as long as they remain chemically indifferent. Thus, for example, air (nitrogen) may be used as well of course as the distillation gas itself.

The accompanying drawing represents a side elevation, partly in section, of an apparatus for carrying my process into effect.

The distillation chamber 10 is by raising pipe 11 connected to a hydraulic main 12, from which a pipe 13 leads to a cooler 14. This cooler receives water from connection 15, which water flows through the cooler pipes 16 and is by connection 17 conveyed to an accumulator or return device (not shown). Cooler 14 is by pipe 18 connected to first washer 19, which, in turn, by pipe 20 is connected to a second washer 21, from which leads pipe 22. Washer 21 is by pipe 23 sprayed with fresh water, and is provided at its bottom with an outlet pipe 24 leading to an accumulator 25. From the latter a pump 26 conveys the liquid through pipe 27 to washer 19. This washer has an outlet pipe 28 leading to a separator 29, which is provided with an overflow 30 leading to tar receptacle 31, and an overflow 32 leading to gas-water receptacle 33. The space in cooler 14 surrounding pipes 16 is, by overflow 34 and pipe 35, also connected to separator 29.

From receptacle 33 a pump 36 lifts the ammonia water through pipe 37 to the distilling column 38. This column contains hoods 39 from which the liquid descends from compartment to compartment. Into column 38 enters steam feed pipe 40 and pipe 41 for introducing lime or any other basic substance. Column 38 is by pipe 42 connected to saturation vessel 43, such pipe opening into a ring 44 having apertures 45 and located at the bottom of vessel 43. In a bottom recess 46 is placed an injector 47 for the removal of the separated salt. Saturation vessel 43 is by pipes 48, 49 connected to the foundation channel 50 of the distilling chamber 10, and is provided with a discharge pipe 51.

The operation is as follows: The gases generated in distilling chamber 10, are in cooler 14, cooled as much as possible during which operation tar and water are separated. The water will at the same time wash out a corresponding quantity of ammonia, so that a mixture of ammonia water and tar is conveyed through pipe 35 into separator 29. In washers 19 and 21, the rest of the ammonia contained in the gas is washed out, this washing being effected in washer 21 by fresh water, and in washer 19 by the discharge water of washer 21, already enriched by ammonia. The ammonia water from washer 19 also flows into the separator 29, where, by specific gravity, a separation of ammonia water and tar takes place. The former will flow over into the gas water receptacle 33, while the latter will flow over into the tar receptacle 31. Within the distilling column 38, the free ammonia is driven off by steam, while simultaneously the fixed ammonia, that is the ammonia already bound in the raw gas with acids, is decomposed by lime or other basic substance introduced through pipe 41.

The vapors of distilling column 38, which thus comprise a mixture of steam and ammonia, are now mixed with air entering through pipe 48 and serving as the rarefying gas, such air having been prewarmed and superheated by the heat radiated by the masonry of the oven.

The mixture produced as described, enters through the acid bath, the saturation vessel 43, where the ammonia remains while the gas vapor mixture, which also carries with it as a vapor the diluting water of the sulfuric acid, passes out through discharge pipe 51. The separated salt is raised by injector 47 and is dried by a centrifugal machine or otherwise.

Besides the advantages already described, such as the production of an almost neutral ammonia salt in solid form, another circumstance is of considerable practical importance. By the lowering of the temperature the quantity of ammonia salt dissolved in the acid bath is reduced, as the solubility of the salt sinks with the temperature. The solution therefore remains more mobile and offers better contact to the penetrating gases than a bath composed of a thick liquid. In this way the proportion of free acid in the resulting salt is reduced, while the pressure required for overcoming the resistance of the bath is diminished.

I claim:

1. Process of obtaining ammonia and tar from gases of the dry distillation or gasification of fuels, which consists in cooling said gases to form a condensate of tar and water, separating the tar therefrom, scrubbing the gas with water to form an aqueous solution of ammonia, passing said condensate and aqueous solution through a distilling column to separate the ammonia, mixing the vapors leaving the distilling column with a rarefying gas, and conducting the resulting mixture to a saturation bath.

2. Process of obtaining ammonia and tar from gases of the dry distillation or gasification of fuels, which consists in cooling said gases to form a condensate of tar and water, separating the tar therefrom, scrubbing the gas with water to form an aqueous solution of ammonia, passing said condensate and aqueous solution through a distilling column to separate the ammonia, mixing the vapors leaving the distilling column with preheated air, and conducting the resulting mixture to a saturation bath.

Signed by me at Chicago, Illinois, this 11 day of January, 1908.

HEINRICH KOPPERS.

Witnesses:
M. E. FLYNN,
A. FLYNN.